US009670012B2

(12) United States Patent
Potter (10) Patent No.: US 9,670,012 B2
(45) Date of Patent: Jun. 6, 2017

(54) GAS-PARTICLE PROCESSOR

(71) Applicant: Owen Potter, Camberwell (AU)

(72) Inventor: Owen Potter, Camberwell (AU)

( * ) Notice: Subject to any disclaimer, the term of this patent is extended or adjusted under 35 U.S.C. 154(b) by 0 days.

(21) Appl. No.: 14/831,423

(22) Filed: Aug. 20, 2015

(65) Prior Publication Data

US 2015/0353298 A1  Dec. 10, 2015

Related U.S. Application Data

(63) Continuation of application No. 13/989,721, filed as application No. PCT/AU2011/001524 on Nov. 25, 2011, now Pat. No. 9,146,055.

(30) Foreign Application Priority Data

Nov. 26, 2010  (AU) ................................ 2010905233

(51) Int. Cl.
*F26B 3/08* (2006.01)
*B65G 53/66* (2006.01)
(Continued)

(52) U.S. Cl.
CPC .............. *B65G 53/66* (2013.01); *B01J 8/005* (2013.01); *B01J 8/0015* (2013.01); *B01J 8/08* (2013.01); *B65G 53/16* (2013.01); *F26B 3/0923* (2013.01); *F26B 17/10* (2013.01); *F26B 17/101* (2013.01); *F26B 17/104* (2013.01);
(Continued)

(58) Field of Classification Search
CPC ...... F26B 3/00; F26B 3/08; F26B 3/10; F26B 5/00; B01J 19/00; B01J 8/00; B01J 8/08; B01J 8/12; B01D 37/00; B01D 53/00; B01D 53/34

USPC .......... 34/413, 497, 177, 182; 422/129, 213; 208/165; 210/109, 110, 741
See application file for complete search history.

(56) References Cited

U.S. PATENT DOCUMENTS 2,376,365 A   5/1945 Lassiat
2,607,537 A   8/1952 Shaw
(Continued)

FOREIGN PATENT DOCUMENTS

AU   WO 2012068631 A1 *   5/2012 .............. F26B 17/10
AU   KR 20140001233 A *   1/2014 .............. F26B 17/10
(Continued)

OTHER PUBLICATIONS

Extended European Search Report in corresponding European Application No. 11 84 2609, dated Feb. 27, 2015.
(Continued)

*Primary Examiner* — Stephen M Gravini
(74) *Attorney, Agent, or Firm* — Knobbe, Martens, Olson & Bear, LLP (57) ABSTRACT

A gas-particle processing method comprising: introducing gas into a chamber through a gas inlet; flowing the gas through the chamber from the gas inlet to the gas outlet at a first controlled mass flowrate; introducing at least one particle stream into the chamber through one or more particle inlets of the chamber at a second controlled mass flowrate; flowing each particle stream through a respective processing region in the chamber; and controlling the first and/or second mass flowrates, such that the gas-particle mixture porosity in a substantial portion of each processing region is 0.900-0.995.

21 Claims, 2 Drawing Sheets

(51) Int. Cl.
*B65G 53/16* (2006.01)
*F26B 17/10* (2006.01)
*F26B 21/00* (2006.01)
*B01J 8/08* (2006.01)
*B01J 8/00* (2006.01)
*F28C 3/12* (2006.01)
*F28D 19/02* (2006.01)
*F26B 3/092* (2006.01)

(52) U.S. Cl.
CPC ............. *F26B 21/003* (2013.01); *F28C 3/12* (2013.01); *F28D 19/02* (2013.01); *B01J 2208/0084* (2013.01); *B01J 2208/00088* (2013.01); *B01J 2208/00548* (2013.01)

(56) References Cited

U.S. PATENT DOCUMENTS

| | | | |
|---|---|---|---|
| 2,865,848 A | 12/1958 | Ramella | |
| 3,557,955 A | 1/1971 | Hirs et al. | |
| 3,905,127 A | 9/1975 | Davis | |
| 4,245,395 A | 1/1981 | Potter | |
| 4,295,281 A * | 10/1981 | Potter | F26B 23/10 34/371 |
| 4,510,271 A | 4/1985 | Muhle et al. | |
| 4,840,651 A * | 6/1989 | Tiggelbeck | B01D 53/0446 34/167 |
| 5,830,246 A * | 11/1998 | Dunlop | C10B 57/10 44/280 |
| 5,960,563 A * | 10/1999 | Kuboyama | A23N 12/08 34/589 |
| 7,895,769 B2 * | 3/2011 | Jochem | C04B 7/40 110/222 |
| 7,987,613 B2 * | 8/2011 | Ness | C10L 9/08 110/249 |
| 9,146,055 B2 * | 9/2015 | Potter | F26B 17/10 |
| 9,194,627 B2 * | 11/2015 | Daley | F26B 5/12 |
| 2002/0168466 A1 * | 11/2002 | Tapphorn | B05B 7/144 427/180 |
| 2003/0152186 A1 | 8/2003 | Jurczyk et al. | |
| 2004/0202884 A1 | 10/2004 | Buresch et al. | |
| 2006/0165564 A1 * | 7/2006 | Cavaglia | B01J 8/003 422/129 |
| 2012/0131989 A1 * | 5/2012 | Vanhanen | G01N 15/06 73/28.01 |
| 2013/0283636 A1 | 10/2013 | Potter | |
| 2015/0353298 A1 * | 12/2015 | Potter | F26B 17/10 406/19 |

FOREIGN PATENT DOCUMENTS

| | | | |
|---|---|---|---|
| AU | EP 2643649 B1 * | 9/2016 | ............. F26B 17/10 |
| DE | 10 2009 054 229 A1 | 7/2011 | |
| GB | 826020 | 12/1959 | |
| GB | 907211 | 10/1962 | |
| GB | 913464 A | 12/1962 | |
| WO | WO 99/34899 | 7/1999 | |
| WO | WO 2012/068631 A1 | 5/2012 | |

OTHER PUBLICATIONS

Wardjiman, C. and Rhodes, M. 2009 "Heat transfer in a particle curtain falling through a horizontally-flowing gas stream" *Powder Technology* 191: 247-253.

* cited by examiner

GAS-PARTICLE PROCESSOR

TECHNICAL FIELD

This present invention relates to gas-particle processes and gas-particle processors, including processes and processors relating to gas-solid heat and mass transfer, gas-catalyst reactions, gas absorption (in liquid droplets) and cooling towers.

BACKGROUND

There are many systems used to conduct gas-solid processes such as gas-particle energy recovery and regeneration, gas-solid chemical reactions, gasification, adsorption, drying, gas absorption and distillation.

Examples of these systems are rotary dryers and rotary kilns, but these are not efficient gas-solid contactors. Other systems such as fluidised beds and circulating fluidised beds have been used instead. However, these systems have their own deficiencies such as an increased pressure drop and contacting inefficiency.

SUMMARY OF THE DISCLOSURE

In a first embodiment, there is provided a gas-particle processor comprising:

a chamber having a gas inlet, a gas outlet and one or more particle inlets;

a gas flow arrangement operable to flow gas through the chamber from the gas inlet to the gas outlet at a first controlled mass flowrate; and a particle flow arrangement operable to introduce particles in one or more streams into the chamber at a second controlled mass flowrate, each particle stream flowing through respective processing regions in the chamber, wherein the processor is operable to control the first and/or second controlled mass flowrates to provide a gas-particle mixture porosity in a substantial portion of each processing region of 0.900-0.995.

The processor may be operable to control the first and/or second mass flowrates to provide a gas-particle mixture porosity through a substantial portion of each processing region of preferably not less than 0.955, even more preferably not less than 0.980, most preferably close to 0.990. This allows a substantial proportion of the particles within a particle stream to be unencumbered, that is particles substantially unhindered by adjacent particles within the particle stream. As a result, increased access to the particles' surface by the gas and a substantially constant velocity of the particle stream may be achieved.

In one form, the processor is operable such that the substantial portion of each processing region is adjacent to its respective particle inlet. In this embodiment, the gas-particle mixture porosity in each processing region may increase away from its respective particle inlet.

The processor may be operable such that the gas-particle mixture porosity is substantially constant through a substantial portion of each respective processing region.

The processor may be operable such that the gas-particle mixture porosity of each processing region increases away from its respective particle inlet.

The particles may be solid particles or may be liquid particles in the form of droplets or thin sheets for example.

Heat and/or mass transfer and/or a chemical reaction may occur between the particles and the gas as they travel through the chamber.

In one form, the processor may be in a horizontal configuration. In another form, the processor may be in a vertical configuration.

The chamber may comprise at least one particle outlet through which particles exit the chamber.

The chamber may comprise one particle outlet for each particle inlet, the particle inlets and outlets configured such that each particle stream enters the chamber through a particle inlet and exits the chamber through a specific particle outlet. Each particle inlet and its specific outlet form a processing stage which also includes the processing region in the chamber occupied by the particle stream between the inlet and outlet of that stage.

Each particle inlet and its specific outlet may be located in respective opposing regions of the chamber.

Each particle inlet may comprise a plurality of inlet portions and each particle outlet comprises a plurality of outlet portions.

Each particle inlet may extend across a substantial portion of the width of the chamber, preferably across the entire width.

Each particle inlet may extend along the length of the chamber for as long as is required to enable the processor to achieve the required gas-particle mixture porosity during operation.

The chamber may comprise a single particle outlet through which the particles from all of the particle inlets exit the chamber. The single particle outlet may comprise a grid, grate or the like in the floor of the chamber.

The particle inlet may be configured as an array of inlets along a region of the chamber and the particle outlets may be configured as an array of outlets along an opposing region of the chamber to that on which the inlets are formed.

The array of particle inlets may comprise an initial inlet and a plurality of subsequent inlets, distributed along the length of the chamber and the array of particle outlets comprise a plurality of intermediate outlets and a final outlet, distributed along the length of the chamber, wherein each intermediate outlet communicates with a respective subsequent inlet such that the processor is operable to recycle particles from each intermediate outlet to its respective subsequent inlet.

The processor may be operable such that each particle stream introduced into the chamber is discrete from other particle streams.

In an embodiment, the gas outlet may act also as a particle outlet from the chamber (the particles then exiting the chamber with the gas) or particles may exit the chamber partly through particle outlets at the chamber walls and partly through the gas outlet, the gas and particles being collected from the gas outlet and separated elsewhere.

Each embodiment where the particles are recycled across the chamber therefore provides a gas particle processor which operates on a "multi-stage" process whereby each particle makes multiple passes through the gas in the processor. This provides the benefit of reducing the space and cost requirements over having multiple processors to carry out repetitive processes on a single particle stream.

In other embodiments the gas-particle processor operates on a "multi-stage" process whereby a number of particle streams are co-processed within the chamber at the same time. This also beneficially reduces the space and cost requirements over having the same number of individual processors.

The chamber may comprise a first end and an opposite second end, the chamber extending between the first and second ends, the gas inlet located near the first end and the gas outlet located near the second end.

The chamber may be enclosed by wall portions whereby the chamber defines an enclosed space in which the processing regions are located.

The chamber may comprise first and second opposite wall portions extending between the first and second ends.

The chamber may be orientated with the second end, at which the gas outlet is located, positioned above the first end, at which the gas inlet is located, and the wall portions extending generally vertically. In this embodiment, the gas flows generally vertically upwards through the chamber from the gas inlet to the gas outlet and the particles may flow generally radially with respect to the wall portions.

The chamber may be orientated with the second end, at which the gas outlet is located, positioned to the side of the first end, at which the gas inlet is located, and the wall portions extending generally horizontally. In this embodiment, the gas flows generally horizontally through the chamber from the gas inlet to the gas outlet and the particles may flow generally vertically between opposite wall portions.

The chamber may be generally cylindrical (where the gas is arranged to flow substantially vertically) or rectangular in shape (where the gas is arranged to flow substantially horizontally).

The at least one particle inlet may be formed in the first wall portion and the at least one particle inlet is formed in the second wall portion.

The chamber may comprise an internal member, the at least one particle inlet being formed in the internal member and the at least one particle outlet being formed in the first and/or second wall portions of the chamber.

The gas flow arrangement may comprise a gas rotator for causing the gas to flow in a spiral flow path through the chamber.

In this embodiment, each particle stream will be introduced into the chamber in a radial direction and then is subject to the centrifugal force of the rotational acceleration imparted on the particles by the rotating gas at each stream's respective particle inlet location, giving the particle stream a radial velocity. Upon introduction in this manner the particles fall with terminal velocity but rise with the upward gas velocity as they travel radially and tangentially with respect to the chamber.

The gas rotator may comprise one or more impellers, paddles, vanes or any other suitable member, device or apparatus which can be used to cause gas to flow in a spiral flow path through the chamber.

The gas rotator may comprise a plurality of impellors, paddles or the like arranged in a number of banks.

The banks may be spaced apart between the gas inlet and gas outlet.

The banks may be positioned between each processing region.

There may also be at least one of the banks located within each processing region.

The banks of impellors, paddles or the like may be mounted onto the internal member by rotatable rings to enable rotation of the banks about the axis of the internal member.

The gas flow arrangement may be operable to flow gas through the chamber from the gas inlet to the gas outlet at a first velocity which is a streamline velocity of the gas through the chamber and the particle flow arrangement is operable to introduce a particle stream into the chamber at a second velocity, the second velocity comprising a first directional component and a second directional component. The processor is operable such that the first directional component of the second velocity of the particles as they are introduced into the chamber is controlled to be substantially equal to the first streamline velocity of the gas in the respective processing region, less any velocity due to known forces that will act on the particles in the opposite direction to the streamline velocity upon introduction to the chamber.

In this way, the energy required to accelerate the particles is provided by the mechanism that feeds particles into the chamber so that each unencumbered particle in the stream has minimal forces acting on the particle by the gas stream and consequently, the pressure drop across the processor (ie. between the gas inlet and the gas outlet of the chamber) is minimised.

The "streamline velocity" of the gas is understood to be the velocity of the gas in a direction that is tangent to the velocity vector of the gas flow.

"Known forces that will act on the particles in the opposite direction" may include gravity and gas resistance.

During operation of the processor, the velocity of the gas will vary across the chamber due to the heat and/or mass transfer processes occurring within the chamber. Accordingly, the first (gas) velocity and any of its components in each respective processing region may be taken as the local gas velocity (or respective component) at a relevant location within the chamber such as near the particle inlet for the respective processing region, but preferably may be determined from the mean of the local velocities (or respective components of the velocities) across the processing region.

The first and second directional components of the second velocity of each particle stream may comprise resolved horizontal and vertical components of the second velocity.

In another embodiment, the second directional component of the second velocity of each particle stream may comprise a radial velocity.

The processor may be operable to introduce the particles in such a way that the second directional component of the second velocity is substantially equal to or greater than the terminal velocity of the particles.

The processor may be operable to introduce the particles under gravitational acceleration to achieve terminal velocity for the second directional component.

The processor may be configured so that the gas flows from the gas inlet to the gas outlet of the chamber substantially linearly whereby the streamline velocity of the gas is a linear velocity between the gas inlet and the gas outlet of the chamber.

The processor may be configured so that the gas flows from the gas inlet to the gas outlet of the chamber along a spiral flowpath whereby the streamline velocity of the gas is aligned with this spiral flowpath. In this embodiment, the first velocity of the gas (the streamline velocity) incorporates a linear velocity component between the gas inlet and the outlet and an angular velocity component.

The processor may be operable to introduce each particle stream into the chamber at a feed angle relative to the direction of the first (gas) velocity, the feed angle and the second velocity of each particle stream being determined so that the first directional component of the second velocity of the particles as they are introduced into the chamber is substantially equal to the streamline velocity of the gas in the respective processing region.

Embodiments of these processors provide, at least in part, gas-particle interactions with high heat and mass transfer rates, a short gas-particle contact time and a low pressure drop across the system.

The particle flow arrangement may comprise one or more particle feeders for feeding particles to the particle inlet(s).

In one embodiment, the particle flow arrangement comprises a single particle feeder which feeds to each of a plurality of particle inlets.

In another embodiment, the processor comprises a particle feeder for feeding particles to each particle inlet.

In an embodiment, the outlet of each feeder may form one of the particle inlets of the chamber.

Each particle feeder may feed particles from one or more storage vessels each in the form of a hopper, bin or similar unit.

In an embodiment, the gas flow arrangement may comprise a gas feeder for feeding the gas to the chamber through the gas inlet.

The gas feeder may be in the form of a compressor, pump, blower or similar unit.

In a second embodiment, there is provided a gas-particle processing method comprising:

introducing gas into a chamber through a gas inlet;

flowing the gas through the chamber from the gas inlet to the gas outlet at a first controlled mass flowrate; and introducing at least one particle stream into the chamber through one or more particle inlets of the chamber at a second controlled mass flowrate;

flowing each particle stream through a respective processing region in the chamber; and controlling the first and/or second mass flowrates such that the gas-particle mixture porosity in a substantial portion of each processing region is 0.900-0.995.

The gas-particle mixture porosity through a substantial portion of each processing region is controlled to be preferably not less than 0.955, even more preferably not less than 0.980, most preferably close to 0.990.

The gas-particle mixture porosity may be controlled to be substantially constant through a substantial portion of each respective processing region.

The gas-particle mixture porosity of each processing region may increase away from its respective particle inlet.

The gas may flow substantially linearly from the gas inlet to the gas outlet.

In an alternative arrangement, gas may flow in a spiral flowpath from the gas inlet to the outlet.

Each particle stream may be introduced into the chamber through a wall portion of the chamber.

In another embodiment, each particle stream is introduced into the chamber from an internal member located within the chamber.

The method may comprise flowing each particle stream from its respective particle inlet to a wall portion of the chamber.

The method may also comprise outputting each stream of particles from the chamber through a respective particle outlet.

The gas may flow through the chamber from the gas inlet to the gas outlet at a first velocity, the first velocity being a streamline velocity of the gas through the chamber and each particle stream may flow into the chamber at a second velocity, the second velocity comprising a first directional component and a second directional component. In this embodiment, the method may also comprise controlling the first directional component of the second velocity of the particles as they are introduced into the chamber to be substantially equal to the first streamline velocity of the gas in the respective processing region, less any velocity due to known forces which will act on the particles in the opposite direction to the gas streamline velocity upon introduction to the chamber.

The first and second directional components of the second velocity may comprise resolved horizontal and vertical components of the second velocity.

In another embodiment, the second directional component of the second velocity of each particle stream may comprise a radial velocity.

Each stream of particles may be introduced with the second directional component of the second velocity substantially equal to or greater than the terminal velocity of the particles.

Each stream of particles may be introduced under gravitational acceleration to achieve terminal velocity for the second directional component.

The method may also comprise flowing the gas from the gas inlet to the gas outlet of the chamber substantially linearly whereby the streamline velocity of the gas is a linear velocity between the gas inlet and the gas outlet of the chamber.

In another embodiment, the method may comprise flowing the gas from the gas inlet to the gas outlet of the chamber along a spiral flowpath whereby the streamline velocity of the gas is aligned with this spiral flowpath. In this embodiment, the first velocity of the gas (the streamline velocity) incorporates a linear velocity component between the gas inlet and the outlet and an angular velocity component.

The method may comprise introducing each particle stream into the chamber at a feed angle relative to the direction of the gas's streamline (first) velocity.

The method may further comprise determining the feed angle for each particle stream to result in the first directional component of the second (particle) velocity to being substantially equal to the streamline velocity of the gas.

Particles with a diameter of less than 300 μm may be used, more preferably with a diameter between 200 μm and 100 μm. The small particle size provides the bulk of particles (at the high porosity in the processing region) with a very high surface are relative to the mass flow. The high surface area of particles enhances exchange processes between the particle and gas streams. In preferred embodiments, the particles also have a narrow size distribution which enables each processing region in the chamber to be kept small and the desired gas-particle mixture porosity to be maintained. Furthermore, it is desirable to use such particles having a small diameter and a narrow size distribution so that each particle stream may be introduced into the processor at a velocity which does not require excessive expenditure of energy or cost to achieve a substantially uniform velocity including in all directional components of each particle stream (second velocity). However, in other embodiments it is possible to use particles with a wide size distribution, although in such instances this may result in some mixing of the particles from different processing regions and/or some of the particles exiting the chamber through the gas outlet.

In a third embodiment, there is provided a gas-particle processor comprising:

a chamber having a gas inlet, a gas outlet and one or more particle inlets;

a gas flow arrangement operable to flow gas through the chamber from the gas inlet to the gas outlet at a first velocity which is a streamline velocity of the gas through the chamber; and a particle flow arrangement operable to introduce one or more streams of particles into the chamber at a second velocity, each particle stream flowing through respective processing regions in the chamber, the second velocity comprising a first directional component and a second directional component, wherein the processor is operable to control the first directional component as the particles are introduced into the chamber to be substantially equal to the streamline velocity of the gas in the respective processing regions less any velocity due to known forces that will act on the particles in the opposite direction to the primary directional component upon introduction to the chamber.

In a fourth embodiment, there is provided a gas-particle processing method comprising:
 introducing gas into a chamber through a gas inlet;
 flowing the gas through the chamber from the gas inlet to the gas outlet at a first velocity which is a streamline velocity of the gas; and
 introducing at least one particle stream into the chamber at a second velocity, the second velocity comprising a first directional component and a second directional component, wherein the method also comprising controlling the first directional component of the second velocity of the particles as they are introduced into the chamber to be substantially equal to the streamline velocity of the gas in the respective processing region, less any velocity due to known forces which will act on the particles in the opposite direction to the gas streamline velocity upon introduction to the chamber.

In another embodiment, there is provided a gas-particle processor comprising:
 a chamber having a gas inlet, a gas outlet and one or more particle inlets;
 a gas flow arrangement operable to flow gas through the chamber from the gas inlet to the gas outlet such that the gas has a linear velocity component between the gas inlet and the gas outlet and an angular velocity component within the chamber; and
 a particle flow arrangement operable to introduce one or more streams of particles into the chamber, each particle stream flowing through respective processing regions in the chamber.

In a further embodiment, there is provided a gas-particle processing method comprising:
 introducing gas into a chamber through a gas inlet;
 flowing the gas through the chamber from the gas inlet to the gas outlet such that the gas has a linear component velocity between the gas inlet and the gas outlet and an angular component velocity within the gas chamber;
 introducing at least one stream of particles into the chamber; and
 flowing each particle stream through a respective processing region in the chamber.

In a further embodiment, there is provided a gas-particle processor comprising:
 a chamber having a gas inlet and a gas outlet which define a chamber length there between, the chamber also having at least two particle inlets;
 a gas flow arrangement operable to flow gas through the chamber from the gas inlet to the gas outlet; and
 a particle flow arrangement operable to introduce one or more streams of particles into the chamber, each particle stream flowing through respective processing regions in the chamber, wherein the chamber length is less than the combined minimum length of the same number as particle inlets of the chamber of substantially identical chambers but which each only operate with a single stream of particles and a single respective processing region.

BRIEF DESCRIPTION OF DRAWINGS

Embodiments of the present invention are hereinafter described by way of example only, with reference to the accompanying drawings, wherein.

DETAILED DESCRIPTION OF EMBODIMENTS

Figure 1:
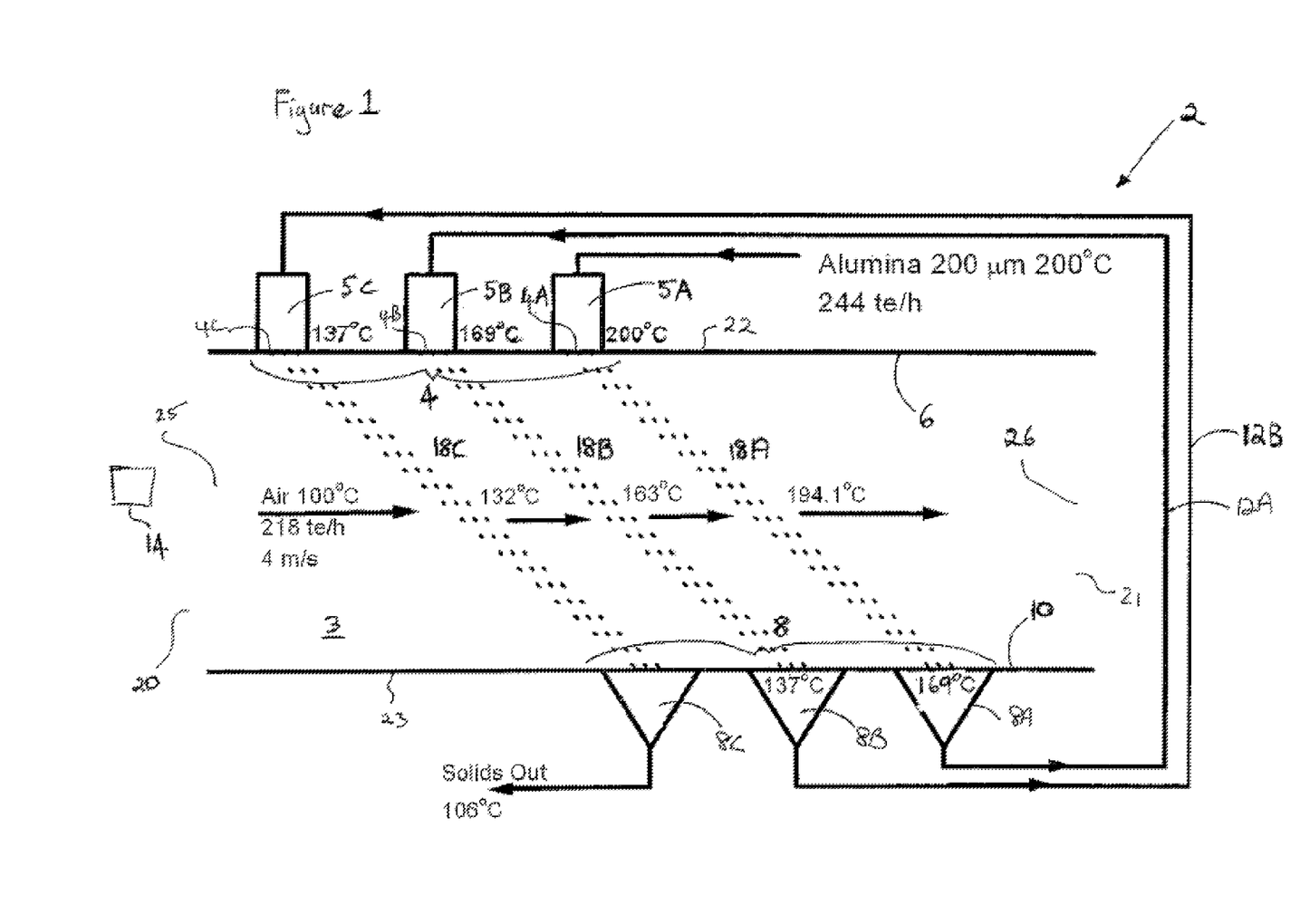
FIG. 1 is a cross-sectional view of a horizontally configured gas-particle processor.

One form of a horizontal gas-particle processor 2 is illustrated in FIG. 1. The processor 2 comprises a chamber 3 having a first end 20, an opposite second end 21 and top and bottom wall portions 22, 23 extending between the first and second ends. The second end is located to the side of the first end and the side wall portions extend generally horizontally so as to define a horizontally orientated chamber.

The chamber 3 has an array of particle inlets 4 comprising first, second and third inlets 4A, 4B and 4C respectively through which particles are introduced into the chamber. Solid particles are fed to each inlet by a particle flow arrangement comprising respective particle feeders with associated particle accelerators 5A, 5B and 5C the feeders feed particles from one or more storage vessels in the form of hoppers, bins or the like. However, in other embodiments the particles may be liquid droplets or thin liquid sheets which are fed by a spray nozzle, atomiser or the like. The particle inlets 4 are formed in a surface 6 of top wall portion 22 of the chamber. The outlets of the feeders communicate with and/or are co-existant with the particle inlets 4. The processor is configured and operated such that the particles fed through each particle inlet produce a stream of particles which flows from a top wall portion to a bottom wall portion, which is separate and discrete from each other particle streams. The inlets 4 are also of a width which extends across a substantial portion, preferably across the entire width of the chamber so that the respective particle streams also extend substantially across the width of the chamber.

The chamber 3 also has an array of particle outlets 8 comprising first, second and third outlets 8A, 8B and 8C respectively through which particles exit the chamber. The particle outlets are formed on a surface 10 of opposite bottom wall portion 23 to that which the inlets are formed on. The first, second and third particle outlets 8A-C oppose, but are offset from, respective first, second and third particle inlets 4A-C. Each outlet is located downstream from its respective inlet due to some horizontal travel of the particles as they move through the chamber. The discrete particle streams flowing from respective particle inlets 4A-C exit the chamber through a specific particle outlet. For example, particles flowing from the first particle inlet 4A exit the chamber through the first particle outlet 8A only. A processing stage 18A-C is defined by each particle inlet and its specific particle outlet and includes a processing region in the chamber occupied by the particle stream as it flows from its inlet to its respective outlet. For example, processing stage 18A is defined by particle inlet 4A and particle outlet 8A and includes the processing region in the chamber occupied by the particle stream between particle inlet 4A and particle outlet 8A. As the particles fall through the gas stream in the processor 2, heat and/or mass exchange and/or a chemical reaction occurs between the particle stream and the gas stream in the processing stages 18A-C. At any moment in time within the chamber 3, the particles streams in the processing stages do not substantially intermix.

Because of the ability of the processor to operate with a number of discrete particle streams, it can act as a "multi-stage" processor. This provides the benefit of reducing the space and cost requirements over having multiple processors to carry out the same number of single particle stream processes.

The arrays of particle inlets and outlets could be configured to recycle particles through the chamber 3. In one form, this recycling could be from each outlet to its respective inlet. In another embodiment, the first particle outlet 8A is connected to the second particle inlet 4B via conduit 12A and the second particle outlet 8B is connected to the third particle inlet 4C via conduit 12B so that particles flow between the connected outlets and inlets. In this embodiment, the first particle inlet 4A defines an initial feed of particles to the chamber 3 and the third particle outlet 8C defines a final outlet for particles to exit the chamber 3 and leave the processor. In a variation, the system may be semi-closed so that some of the particles leave the processor at the third particle outlet but some are recycled to the first particle inlet with a make-up of particles added to compensate for the particles that have exited the system.

It is of course to be understood that the processor may comprise more or less particle inlets and outlets. In one variation, the processor may comprise a single particle outlet formed at the bottom of the chamber which receives all the particles entering the chamber through the inlets.

In a further variation, each inlet and outlet may respectively comprise a plurality of inlet or outlet portions defined by grids or grates for example. In particular, the floor of the chamber, in some embodiments, may be in the form of a grate or grid which allows the particles to fall through the floor and be collected underneath the chamber.

The chamber 3 also comprises a gas inlet 25 located at the first end 20 and a gas outlet 26 located at the second end 21 of the chamber 3 whereby gas flows along the length of the chamber between the inlet and the outlet during operation of the processor 2. To provide and direct this flow of gas, the processor 2 comprises a gas flow arrangement incorporating a gas feeder 14 which feeds gas to the gas inlet 25 of the chamber, and possibly one or more flow straighteners. The gas feeder is in the form of a pump, compressor, blower or the like.

The gas and each particle stream have respective first and second mass flowrates through the chamber. Preferably, during operation of the processor one or both of these mass flowrates are controlled such that the gas-particle mixture porosity in a substantial portion of each processing region and preferably substantially through each processing region is 0.900-0.995 (preferably close to 0.990). This allows a substantial proportion of the particles with the particle stream to be unhindered by adjacent particles in the particle stream. As a result, increased access to the particles' surface by the gas and a substantially constant velocity of the particle stream may be achieved. At the same time the gas-particle mixture porosity is limited so that the gas's first mass flowrate would not be unfeasibly low and hence so that the chamber is not required to be excessively long. The particle inlets 4 extend along the length of the chamber for as long as is required to enable the processor to achieve the required gas-particle mixture porosity during operation.

For the processor 2 shown in FIG. 1, the processor is operated such that the gas-particle mixture porosity is generally constant through each processing region, particularly if the particles are introduced into the chamber at terminal velocity. However, the gas-particle mixture porosity may be higher in the portion of each processing region adjacent its respective particle inlet than in the remainder of the processing region if the particles are introduced at a velocity greater than terminal velocity.

Either but preferably both the gas and particle mass flow rates may be controlled, the selection of which being based on the application for which the gas-particle processor is being used. For example, in a gas-catalyst process, the process may be gas and particle phase controlled because of the reaction, with catalyst particle flow controlled to provide the required chemical conversion. Where the processor is used as a cooling tower for example (with particles in the form of liquid droplets), operation of the processor may also be gas phase controlled. In this application, the liquid particles are injected at a mass flow rate that will provide the surface area for the cooling tower process.

The processor 2 is operated such that the gas flows through the chamber 3 at a streamline (first) velocity which is generally linear in the horizontal direction. To assist in achieving this, flow straighteners such as baffles may be provided near the gas inlet 25. It is noted that during operation the gas velocity will vary across the chamber due to the heat and/or mass transfer occurring within the chamber.

Each stream of particles is introduced into the chamber at a second velocity and a feed angle with respect to the direction of the streamline velocity of the gas. This gives the second velocity a first directional component and a second directional component. The second directional component is the velocity of the particles perpendicular to the direction of the gas flow, ie. a vertical velocity. The first directional component is the velocity of the particles parallel to the direction of the streamline velocity of the gas, ie. the horizontal velocity.

The second velocity (the velocity of the particles) as well as the feed angle of the particles are controlled such that the first directional component of the particles velocity as they are introduced to the chamber is substantially equal (in magnitude and direction) to the streamline velocity of the gas velocity. It is noted that because the gas velocity varies across the length of the chamber (due to the heat and/or mass transfer processes occurring within the chamber) the first (gas) velocity and any of its components in each respective processing region is taken either as the local gas velocity (or respective component) at a relevant location within the chamber such as near the particle inlet for the respective processing region, or preferably is determined from the mean of the local velocities (or respective components of the velocities) across the processing region.

The second velocity (the velocity of the particles) is also controlled so that the second (vertical) directional component is substantially equal to the terminal velocity of the particles in the gas.

Accordingly, the second velocity at which the particles are introduced into the chamber and the feed angle of the particles are determined from knowledge of the first and second directional components.

By operating the processor with the above described velocities and mass flowrates, the energy required to accelerate the particles as they enter the chamber is provided by their respective particle feeder so that each unencumbered particle in each stream has minimal forces acting on the particle by the gas stream. Consequently the pressure drop across the processor (ie. between the gas inlet and the gas outlet of the chamber) is minimised.

In a variation, the particles may be simply dropped vertically into the chamber so that they fall under gravitational acceleration. Such a process would not have as low a pressure drop across the chamber as is the case where the particles enter with the above described horizontal and vertical components and therefore would not be as efficient. However, this variation could be operated with the mass flowrates of the gas and particles controlled such that the gas-particle mixture porosity in a substantial portion of each processing region is 0.900-0.995, preferably close to 0.990.

It is desirable also to use particles with a small diameter and a narrow sized distribution in the processor. Typically particles with a diameter less than 300 µm, more preferably between 200 and 100 µm are used. The use of such small particles provides a very high surface area of particles when mixed with the gas in the processing regions in the chamber at the gas particle mixture porosities referred to above. Such a high surface area enhances the exchange processes between the particles and the gas enabling the processor to operate at high efficiencies. Use of particles having a narrow size distribution also enables the processing region in the chamber to be kept narrow and makes it easier to retain the desired porosity of the gas particle mixture. The combination of these attributes of the particles enables each particle stream to be introduced into the processor at a velocity which does not require excessive expenditure of energy or cost to achieve a substantially uniform particle velocity.

In some applications, it is also desirable to use particles having a high porosity such as in a gas catalyst processor. However, this may not be the case in some embodiments, such as in a heat transfer processor where the high porosity may lower thermal conductivity within the particle.

Figure 2:
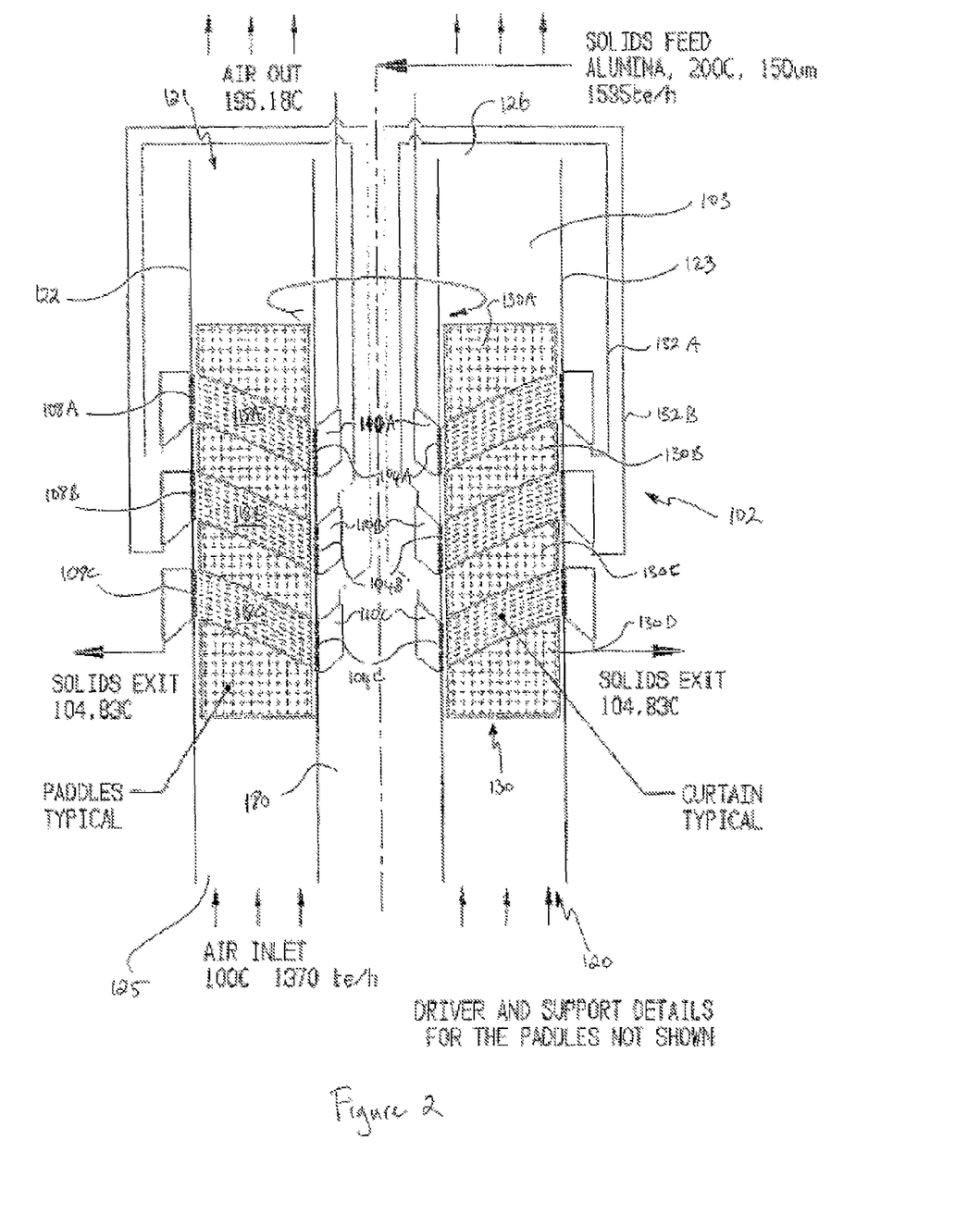
FIG. 2 is a cross-sectional view of a vertically configured gas-particle processor.

Referring now to FIG. 2, a vertical gas-particle processor 102 according to another embodiment is shown. Similar features of the processor 102 to the processor 2 shown in FIG. 1 have been marked with the same reference number but prefixed with the numerals 1 or 10.

The processor 102 comprises a generally cylindrical chamber 103 which is orientated vertically such that the second end 121 at which the gas outlet 126 is located is positioned above the first end 120 at which the gas inlet 125 is located. The opposite side wall portions 122, 123 extend vertically between the ends 120, 121. The gas thus flows vertically through the chamber 103 from the bottom to the top during operation of the processor 102. A central internal member or column 180 is provided within the chamber on which the particle inlets 104A-C are located. The particles thus enter chamber form the centre of the chamber. Particle feeders 110A-C feed to the inlets 104A-C located on the internal member 180.

Upon entering the chamber, the particles travel along a spiral flowpath out towards the inner surface of the chamber carried by a spiralling gas flow which is under the influence of a gas rotator (described below) where they exit the chamber through the particle outlets 108A-C. Each particle outlet 108A-C is located upstream of its respective inlet 104A-C as the particles are carried upwards somewhat by the gas (against gravity) as the particles move through the chamber.

Although the gas moves in a general direction which is vertical through the chamber 103, the gas flow arrangement of the processor 102 of FIG. 2 also comprises a gas rotator 130 for rotating the gas within the chamber. This causes the gas to spiral through the chamber in operation. The gas rotator 130 comprises banks of plate-like paddles 130A-F located in and between the processing regions 118A-C, which help to maintain the direction and magnitude of the gas velocity through the chamber 3. The gas rotator may also in addition to or instead of the paddles comprise vanes, fixed at the bottom of the chamber near the gas inlet. The paddles 130A-F are mounted onto the internal member 180 within the chamber by rotatable rings or the like to allow rotation of the banks about the axis of the column by a motor. Because the gas is spiralling, it causes a similar spiralling of the particles within the chamber by the gas rotator. Paddles 130A, 130C and 130E are located between processing stages 118A, 118B and 118C, respectively, while paddles 130B, 130D and 130F are located within the processing stages 118A, 118B and 118C, respectively.

In this embodiment shown in FIG. 2, the streamline velocity of the gas (the first velocity) incorporates a linear velocity component between the gas inlet and the gas outlet, which is in a vertical direction against gravity and an angular velocity component imparted by the rotation of the gas rotator. In operation, the gas may have a distribution of angular velocities across the chamber.

The gas rotation inside the chamber drags particles tangentially as they are introduced through their respective particle inlets on the centrally located column. The associated centrifugal forces result in radial acceleration of the particles within the chamber. Thus the particles spiral out towards the sides of the chamber, where they exit through their respective particle outlets. The particles are also carried along in the direction of the gas flow between the inlet and outlet upwards against gravity (provided the vertical gas velocity is greater than the terminal velocity of the particles falling under gravity).

The particle streams are introduced into the chamber where they are subjected to the centrifugal force of the rotational acceleration imparted on the particles by the rotating gas at each particle stream's respective particle inlet location. Upon introduction in this manner the particles fall with terminal velocity relative to the gas but rise with the upward gas velocity in the vertical system as they travel radially and tangentially with respect to the chamber.

The particles are introduced at a second velocity which resolves into a first directional component which is substantially equal to the streamline velocity of the gas less any velocity due to known forces that will act on the particles in the opposite direction to the streamline velocity upon introduction to the chamber including for example gravity in this vertically arranged processor 102, and a second directional component in the radial direction which is substantially equal to or greater than the terminal velocity of the particles.

As with the above described horizontal system, by operating the vertically arranged processor 102 in this manner, the energy required to accelerate the particles as they enter the chamber is provided by their respective particle feeder so that each unencumbered particle in each stream has minimal forces acting on the particle by the gas stream. Consequently the pressure drop across the processor (ie. between the gas inlet and the gas outlet of the chamber) is minimised.

Further, by operating the processor such that the radial velocity of the particles at the location of each stream's respective particle inlet is not less than the terminal velocity of the particles, the feeder length to be reduced whilst maintaining the same gas particle mixture porosity adjacent to the particle inlets. It is also desirable to maintain the radial velocity of the particles higher at shorter radii in the chamber, so that the difference in gas-particle mixture porosity across the radius of the chamber is not too large.

The gas and each particle stream has respective first and second mass flowrates through the chamber. During operation of the processor one or preferably both of these mass flowrates are controlled such that the gas-particle mixture porosity in a substantial portion of each processing region and preferably substantially through each processing region is 0.900-0.995 (preferably close to 0.990). This allows a substantial proportion of the particles with the particle stream to be unhindered by adjacent particles in the particle stream. As a result, increased access to the particles' surface by the gas and a substantially constant velocity of the particle stream may be achieved. At the same time is the gas-particle porosity is limited so that the gas's first mass flowrate would not be unfeasibly low and hence so that the chamber is not required to be excessively long.

For the processor 102 shown in FIG. 2, the gas-particle mixture porosity of each processing region increases away from its respective particle inlet. This may mean that the gas-particle mixture porosity becomes greater than 0.995 in a portion of each processing region furthest from its respective particle inlet, ie. adjacent the particle outlets 108A-C at the side wall portions 122, 123.

It is of course to be understood that the processor may comprise more or less particle inlets and outlets. In other variations, the gas outlet acts also as the particle outlet from the chamber (i.e. the particles exit with the gas), or particles exit the chamber partly through particle outlets at the chamber walls and partly through the gas outlet the gas and particles that are collected from the gas outlet being subsequently separated elsewhere.

The embodiments described and shown above in respect of FIGS. 1 and 2 may be used in numerous applications. For example they may applied in a heat exchanger or an absorber/desorber.

The processor is also appropriate for energy recovery from gas-solid processes. One example involves a regenerator comprising two exchangers, whereby an outgoing hot gas stream exchanges heat with a particle stream in one exchanger and the heated particles are used to heat another gas stream in a second exchanger. Another example relates to an air preheater unit comprising two exchangers, wherein the first exchanger cools a flue-gas stream from a boiler using a particle stream and the heat transferred to the particle stream from the flue-gas stream is transferred to an unheated air stream fed to the boiler in a second exchanger.

In another application, the processor, in particular the vertical embodiment shown in FIG. 2, may be employed as a cooling tower where the particles are in a form of liquid droplets. In such an application, the liquid particle mass flow rate is controlled to be a value which produces maximum cooling for the given gas mass flow rate, but with a high gas velocity imposed.

EXAMPLES

FIG. 1 illustrates the horizontal gas-particle processor and FIG. 2 illustrates the vertical gas-particle processor used to conduct the following examples 1 and 2, respectively. The Examples provide calculations under ideal or theoretical conditions. In actual applications, some reduction in efficiency must be allowed for.

Example 1

Gas feeder 14 introduces a stream of gas at a mass flowrate of 218 tonnes/hr, a velocity of 4 m/s and a temperature of 100° C. into a 4 m×4 m chamber. The gas stream exits the chamber from gas outlet 26.

A stream of alumina particles of 200 μm in diameter, a mass flowrate of 244 tonnes/hr and a temperature of 200° C. is introduced into the chamber from particle feeder 5A.

As the particles fall through the gas stream, heat exchange occurs between the particle stream and the gas stream at stage 18A. This results in cooling of the alumina stream to 169° C. under ideal conditions. Recycling of this particle stream occurs as it exits through particle outlet 8A and is fed to particle inlet 4B via conduit 12A. For the purposes of this calculation, no or little heat exchange is assumed for the flow in any connecting conduits. The particle stream re-enters processor 2 at stage 18B. Further heat exchange between the particle stream and the gas stream occurs as the temperature of the particle stream drops from 169° C. to 137° C. under ideal conditions. This process is further repeated at stage 18C, where particles cooled to a final temperature of 106° C. (under ideal conditions) exits through particle outlet 8C.

Concurrently, the gas stream is (under ideal conditions) heated from 100° C. to 132° C. as it contacts stage 18C; and to a final temperature of 194° C. as it contacts stage 18A.

Example 2

Gas feeder 114 introduces a stream of gas at a mass flowrate of 1370 tonnes/hr, a velocity of 4 m/s and a temperature of 100° C. into a chamber having a 12 m outer diameter and a central particle feeder member which is 4 m in diameter. The gas stream exits processor 102 from gas outlet 126. Paddles 130A, 130B and 130C are located between processing stages 118A, 118B and 118C to provide a means for gas rotation. Additional paddles 130B, 130D and 130F may be located within stages 118A, 118B and 118C, respectively, which may be also used to regulate the rotational velocity of the gas. These paddles would be in the form of a number of small paddles fixed to a rotating framework.

A stream of alumina particles of 150 μm in diameter, at a mass flowrate of 1535 tonnes/hr and a temperature of 200° C. is introduced into the chamber from particle feeder 110A.

As the particles are introduced into the chamber through particle inlet 104A, centrifugal forces imparted by the spiralling gas stream to the particle stream cause the particle stream to spiral out towards the chamber surface such that the particle stream in stage 118C is received by particle outlet 108A. The particle stream subsequently travels via conduit 132A to particle inlet 104B. This process repeats itself as the particle stream in stage 118B is received by particle outlet 108B and is transferred to particle inlet 104C via conduit 134B. The particle stream finally exits processor 102 through particle outlet 108C. Heat transfer occurs between the particle stream and the gas stream at processing stages 118A, 118B and 118C, resulting in a final particle stream temperature of 105° C. and a final gas stream temperature of 195° C. (under ideal conditions).

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

The invention claimed is:

1. A gas-particle processing method comprising: introducing gas into a chamber through a gas inlet;
flowing the gas through the chamber from the gas inlet to a gas outlet at a first controlled mass flowrate; and
introducing at least one particle stream into the chamber through one or more particle inlets of the chamber at a second controlled mass flowrate;
flowing each particle stream through a respective processing region in the chamber; and
controlling the first and/or second controlled mass flowrates such that a gas-particle mixture porosity in a substantial portion of each processing region is 0.900-0.995.

2. A processing method as claimed in claim 1, wherein the gas-particle mixture porosity in a substantial portion of each processing region is controlled to be about 0.990.

3. A processing method as claimed in claim 1, wherein the gas-particle mixture porosity is controlled to be substantially constant through a substantial portion of each respective processing region.

4. A processing method as claimed in claim 1, wherein the gas-particle mixture porosity of each processing region increases away from a respective particle inlet.

5. A processing method as claimed in claim 1, wherein the gas flows substantially linearly from the gas inlet to the gas outlet.

6. A processing method as claimed in claim 1, wherein the gas flows in a spiral flowpath from the gas inlet to the outlet.

7. A processing method as claimed in claim 1, wherein each particle stream is introduced into the chamber through a wall portion of the chamber.

8. A processing method as claimed in claim 1, wherein each particle stream is introduced into the chamber from an internal member located within the chamber.

9. A processing method as claimed in claim 1, the method comprising flowing each particle stream from a respective particle inlet to a wall portion of the chamber.

10. A processing method as claimed in claim 1, wherein the method also comprises outputting each stream of particles from the chamber through a respective particle outlet.

11. A processing method as claimed in claim 1, wherein the gas flows through the chamber from the gas inlet to the gas outlet at a first velocity, the first velocity being a streamline velocity of the gas through the chamber and wherein each particle stream may flow into the chamber at a second velocity, the second velocity comprising a first directional component and a second directional component,
wherein the method also comprises controlling the first directional component of the second velocity of particles as they are introduced into the chamber to be substantially equal to the first streamline velocity of the gas in the respective processing region, less any velocity due to known forces which will act on the particles in an opposite direction to the streamline velocity of the gas upon introduction to the chamber.

12. A processing method as claimed in claim 11, wherein the first and second directional components of the second velocity comprise resolved horizontal and vertical components of the second velocity.

13. A processing method as claimed in claim 11, wherein each stream of particles is introduced with the second directional component of the second velocity substantially equal to or greater than a terminal velocity of the particles.

14. A processing method as claimed in claim 11, wherein each stream of particles is introduced under gravitational acceleration to achieve terminal velocity for the second directional component.

15. A processing method as claimed in claim 11, wherein the method comprises flowing the gas from the gas inlet to the gas outlet of the chamber substantially linearly whereby the streamline velocity of the gas is a linear velocity between the gas inlet and the gas outlet of the chamber.

16. A processing method as claimed in claim 11, wherein the method comprises flowing the gas from the gas inlet to the gas outlet of the chamber along a spiral flowpath whereby the streamline velocity of the gas is aligned with a spiral flowpath.

17. A processing method as claimed in claim 11, wherein the second directional component of the second velocity of each particle stream is a radial velocity.

18. A processing method as claimed in claim 11, where the method comprises introducing each particle stream into the chamber at a feed angle relative to the direction of a gas streamline (first) velocity.

19. A processing method as claimed in claim 18 further comprising determining a feed angle for each particle stream to result in the first directional component of the second (particle) velocity to being substantially equal to the streamline velocity of the gas.

20. A processing method as claimed in claim 1, wherein particles used have a diameter of less than 300 pm.

21. A processing method as claimed in claim 1, wherein particles used have a diameter of between 200 pm and 100 pm.

* * * * *

UNITED STATES PATENT AND TRADEMARK OFFICE
CERTIFICATE OF CORRECTION

PATENT NO. : 9,670,012 B2
APPLICATION NO. : 14/831423
DATED : June 6, 2017
INVENTOR(S) : Owen Potter Page 1 of 1

It is certified that error appears in the above-identified patent and that said Letters Patent is hereby corrected as shown below:

Column 16 Line 48, Claim 20, change "300 pm" to --300 μm--.

Column 16 Line 50, Claim 21, change "200 pm" to --200 μm--.

Column 16 Lines 50-51, Claim 21, change "100 pm" to --100 μm--.

Signed and Sealed this
Thirtieth Day of October, 2018

Andrei Iancu
*Director of the United States Patent and Trademark Office*